W. P. HARPER.
CULTIVATOR.
APPLICATION FILED DEC. 17, 1914.

1,139,118.

Patented May 11, 1915.
3 SHEETS—SHEET 1.

WITNESSES:
R. Hamilton
E. B. House.

INVENTOR.
William P. Harper.
BY
Warren D. House
His ATTORNEY

W. P. HARPER.
CULTIVATOR.
APPLICATION FILED DEC. 17, 1914.

1,139,118.

Patented May 11, 1915
3 SHEETS—SHEET 3.

WITNESSES:
R. Hamilton
E. B. House.

INVENTOR.
William P. Harper,
BY Warren D. House
His ATTORNEY

UNITED STATES PATENT OFFICE.

WILLIAM P. HARPER, OF ABILENE, KANSAS, ASSIGNOR OF ONE-HALF TO JOHN S. DUFFY, OF ABILENE, KANSAS.

CULTIVATOR.

1,139,118.  Specification of Letters Patent.  Patented May 11, 1915.

Application filed December 17, 1914. Serial No. 877,684.

*To all whom it may concern:*

Be it known that I, WILLIAM P. HARPER, a citizen of the United States, residing at Abilene, in the county of Dickinson and State of Kansas, have invented certain new and useful Improvements in Cultivators, of which the following is a specification.

My invention relates to improvements in cultivators.

The object of my invention is to provide a cultivator in which the shovels may be quickly adjusted to and held in different positions.

Another object of my invention is to provide a cultivator of novel construction and with which a single operator or driver may simultaneously operate a plurality of cultivator units respectively drawn by a plurality of teams of draft animals.

Other novel features of my invention are hereinafter fully described and claimed.

Figure 1:
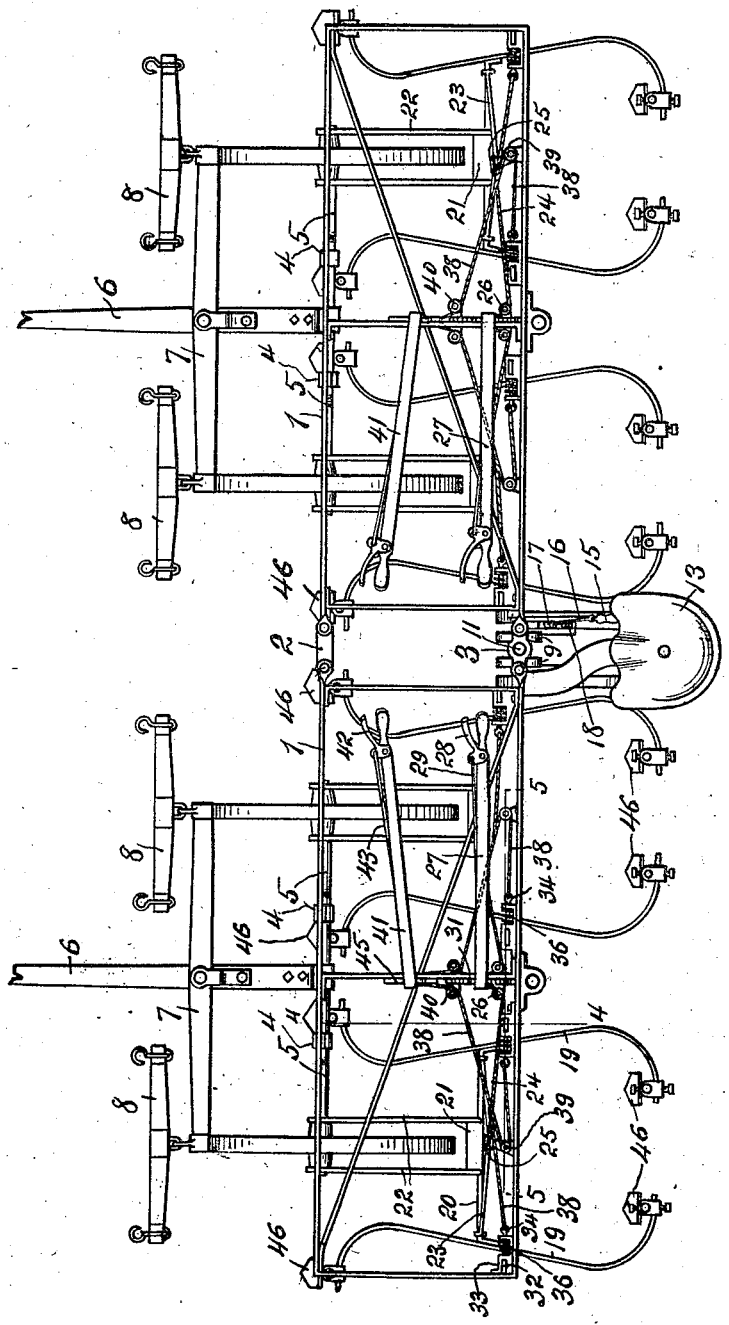
Figure 2:
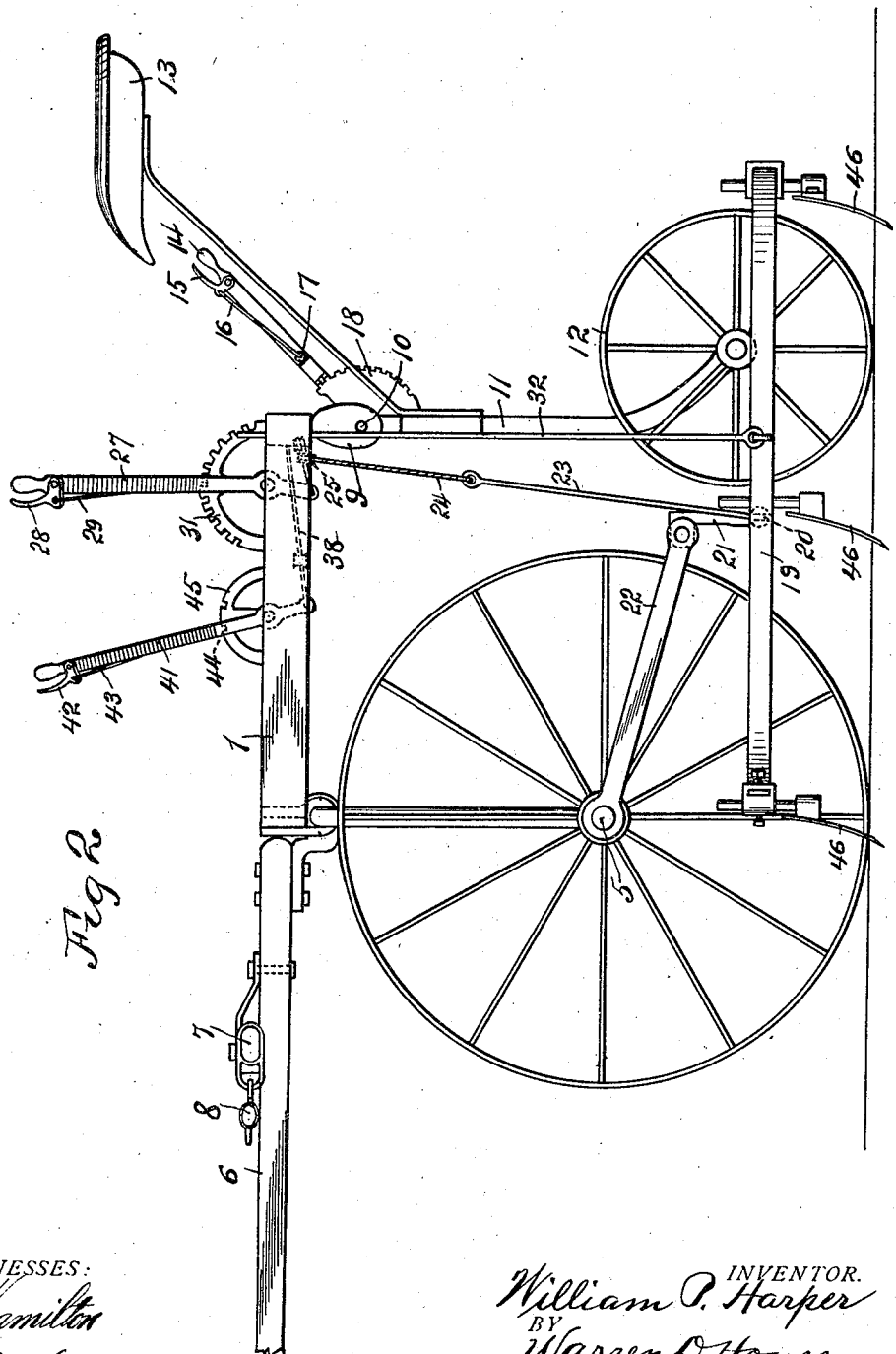

In the accompanying drawings, which illustrate the preferred embodiment of my invention, Figure 1 is a plan view of my improved cultivator having a plurality of cultivator units. Fig. 2 is an enlarged side elevation of the same. Fig. 3 is a rear elevation of the same, partly broken away. Fig. 4 is an enlarged vertical sectional view on the line 4—4 of Fig. 1. Fig. 5 is an enlarged vertical sectional view on the line 5—5 of Fig. 1.

Similar reference characters designate similar parts in the different views.

1 designates each of two horizontal main frames, which are connected together, preferably flexibly, and at their adjacent ends by plates 2 and 3, the ends of which are pivoted to the respective main frames 1. The main frames 1 are respectively pivoted by loops 4 to the upper horizontal portions of two arched axles 5, which are respectively secured to tongues 6 which carry the usual draft appliances comprising doubletrees 7 and swingletrees 8.

The rear edges of the main frames 1 are respectively supported on cams 9 secured to a horizontal rock shaft 10, which is pivoted in a wheeled supplemental support, comprising an upright standard 11, Fig. 3, of inverted U form, the lower ends of the arms of which have carrying wheels 12 respectively rotatably mounted thereon, the upper end being slidable in the plate 3. A driver's seat 13 may be supported by the supporting standard 11.

Secured to the rock shaft 10 is a lever 14, which is accessible to the driver occupying the seat 13, and which has pivoted to it a bell crank lever 15, connected to a rod 16, which in turn connects with and is adapted to operate in the usual well known manner, a sliding locking bolt 17, which is adapted to engage a notched plate 18 secured to the standard 11. By swinging the lever 14, the driver may rock the cams 9 for raising and permitting to lower the main frames 1.

A plurality of shovel frames are vertically adjustably supported by the main frames 1 in the following manner: Each shovel frame comprises two reversely disposed horizontal beams 19, which are connected with each other and secured to a transverse bar 20 to which is secured the lower end of a vertical bar 21, the upper end of which is pivoted to the rear ends of two draft bars 22, which in turn have their forward ends pivoted to the adjacent axle 5. The draft bars 22 serve to draw the shovel frames forwardly as the cultivator moves along.

For supporting the shovel frames, the following described mechanism is provided: An inverted V shaped member 23 has its lower ends formed into eyes through which extends the adjacent cross bar 20. The apex of the V shaped member 23 is secured to the lower end of a cable 24 which passes upwardly therefrom to and over a pulley 25, which is mounted on the adjacent main frame 1, thence passing horizontally to and around another pulley 26 to the lower end of a lever 27 to which the cable is secured. The levers 27, of which two are provided, are respectively pivoted to the main frames 1, and are provided each with a bell crank lever 28, which is connected by a rod 29 with a slide bolt 30, which is adapted to engage in the usual manner, a notched plate 31, which is secured to the adjacent main frame 1. By swinging the levers 27, the shovel frames may be raised or lowered.

To opposite sides of each shovel frame are respectively pivoted the lower ends of two upstanding bars 32, which, adjacent to their upper ends are respectively slidably mounted in brackets 33 which are secured to the main frames 1, having respectively slidably and horizontally mounted therein bolts 34, which are adapted to respectively enter either one of two notches 35 provided one above the other in each bar 32, Fig. 5. Coil springs 36 respectively encircle the bolts 34 and are adapted to respectively bear at one set of ends against pins 37 respectively carried by the bolts 34. The other sets of ends of the springs 36 respectively bear against the brackets 33, the tension of the springs being such as to normally force the bolts into position for entering the adjacent notches, for supporting the shovel frames in either the raised position, when the bolts are in the lower notches 35, or in the lower position, when the bolts are in the upper notches, as shown in Figs. 1, 2, 3, 4 and 5.

With the bolts 34 engaged with the bars 32, the shovel frames will be raised or lowered when the main frames 1 are vertically swung by means of the lever 14. For withdrawing the bolts 34 from the notches 35, said bolts are respectively secured to cables 38, which pass therefrom to and around pulleys 39, and thence around pulleys 40 secured to the main frames 1 to the lower ends respectively of two levers 41 respectively supported pivotally on the main frames 1, the cables 38 being secured respectively to said levers 41. Pivoted respectively to said levers 41 are two bell crank levers 42 which are respectively secured to rods 43, which in turn are respectively secured to slide bolts 44 adapted respectively to engage notched plates 45 respectively secured to the main frames 1. By properly swinging the levers 41, the bolts 34 may be released from the bars 32, after which the levers 27 may be swung to raise the shovel frames and bars 32, or to permit them to lower by gravity. Or by swinging the levers 27, with the bolts 34 engaged with the bars 32, the shovel frames may be tilted from the horizontal to permit either the forward or rear shovels 46, carried by the shovel frame beams 19, to be relatively raised or lowered.

The driver at any time may, by operating the lever 14, permit the main frames to lower, thereby, when the bars 32 are engaged by the bolts 34, forcing the shovel frames downwardly to cause the shovels 46 to enter the earth more deeply. When not in use the shovels may be raised clear of the ground by releasing the bolts 34, operating the levers 27 to lift the shovel frames to the proper height, and then permitting the bolts 34 to enter the lower notches 35 in the bars 32, thereby releasably supporting the shovel frames in the elevated position. By means of the pivotal connection of the shovel frames with the axles 5, through the intermediacy of the draft bars 22, the shovel frames may be bodily raised while retaining a horizontal position.

I do not limit my invention to the structure shown and described, as modifications, within the scope of the appended claims, may be made without departing from the spirit of my invention.

Having thus described my invention, what I claim and desire to secure by Letters Patent, is:—

1. In a cultivator, the combination with an axle, of a main frame pivoted thereto and partly supported thereby, a wheeled supplemental support relative to which the main frame is vertically adjustable, a horizontal rock shaft pivoted in said supplemental support, a cam secured to said rock shaft and supporting said main frame, a lever for swinging said rock shaft, means for releasably holding the lever in different positions to which it may be swung, a shovel frame, and means carried by the main frame for supporting and vertically adjusting the shovel frame.

2. In a cultivator, the combination with an axle, of a main frame pivoted thereto and partly supported thereby, a wheeled support relative to which the main frame is vertically adjustable, a horizontal rock shaft pivoted to said support, a cam secured to said rock shaft and supporting the main frame, a lever for rocking said rock shaft, means for releasably holding the lever in different positions to which it may be swung, a shovel frame, a draft bar pivoted to the axle and to the shovel frame, and means carried by the main frame for supporting and vertically adjusting the shovel frame.

3. In a cultivator, the combination with an axle, of a main frame supported thereby, a shovel frame, a bar connected to the shovel frame and vertically movable relative to the main frame, releasable means for locking the said bar in different positions relative to the main frame, a lever carried by the main frame, means actuated by said lever for lifting the shovel frame, and a draft bar pivoted to the axle and to the shovel frame.

4. In a cultivator, the combination with an axle, of a main frame pivoted thereto and partly supported thereby, a shovel frame, a bar connected to the shovel frame and vertically movable relatively to the main frame, means for releasably locking said bar in different positions relatively to the main frame, a lever, means actuated by said lever for lifting the shovel frame, a draft bar pivoted to the axle and to the shovel frame, a wheeled supplemental support relative to which the main frame is vertically adjustable, and manually operated means for vertically adjusting and supporting the main frame upon the supplemental support.

5. In a cultivator, the combination with an axle, of a main frame pivoted thereto and partly supported thereby, a shovel frame, a bar connected to the shovel frame and vertically movable relatively to the main frame, means for releasably locking the said bar in different positions relatively to the main frame, a lever, means actuated by the lever for lifting the shovel frame, a draft bar pivoted to the axle and to the shovel frame, a wheeled supplemental support relative to which the main frame is vertically adjustable, a rock shaft pivoted to the supplemental support, a cam carried by and rotatable with said rock shaft and adapted to support the main frame, and means for rocking the rock shaft and for retaining it in different positions.

6. In a cultivator, the combination with two axles and carrying wheels mounted thereon, of two main frames respectively pivotally connected to said axles, two shovel frames respectively pivoted to said axles and respectively supported by said main frames, a wheeled supplemental support, and means carried by said supplemental support for simultaneously vertically swinging and supporting said main frames.

7. In a cultivator, the combination with two axles and carrying wheels mounted thereon, of two main frames, two shovel frames respectively supported by said main frames, two draft bars respectively pivoted to said axles and to said shovel frames, a wheeled supplemental support, and means carried by said supplemental support for simultaneously vertically swinging and supporting said main frames.

In testimony whereof I have signed my name to this specification in presence of two subscribing witnesses.

WILLIAM P. HARPER.

Witnesses:
L. L. MERRIFIELD,
O. W. HANCOCK.